United States Patent [19]

Miller

[11] E Re. 29,252

[45] Reissued June 7, 1977

[54] SEQUENCING VALVE

[76] Inventor: Bob C. Miller, 272 River Drive, Tequesta, Fla. 33458

[22] Filed: Jan. 15, 1976

[21] Appl. No.: 649,452

Related U.S. Patent Documents

Reissue of:

[64] Patent No.: 3,785,391
Issued: Jan. 15, 1974
Appl. No.: 324,236
Filed: Jan. 16, 1973

[52] U.S. Cl. ..... 137/119; 137/624.14; 137/625.11

[51] Int. Cl.[2] ..... F16K 21/00

[58] Field of Search ..... 137/119, 624.14, 625.11, 137/625.15; 239/533, 571

[56] References Cited

UNITED STATES PATENTS

| | | | |
|---|---|---|---|
| 3,369,565 | 2/1968 | Haggard | 137/625.11 |
| 3,431,933 | 3/1969 | Tidd | 137/119 |
| 3,635,237 | 1/1972 | Kah | 137/119 |

*Primary Examiner*—Robert G. Nilson

[57] ABSTRACT

A flow sequencing valve which employs separate valve elements to generate the force for cycling and to accomplish discharge port sealing is disclosed. The valve may include an integral pilot solenoid for controlling cycling and is characterized by a force generating element, in the form of a variable resistance to flow, which is free to overtravel relative to the port sealing member whereby flow rate compensation is achieved and water hammer effects eliminated.

20 Claims, 5 Drawing Figures

FIG. 1
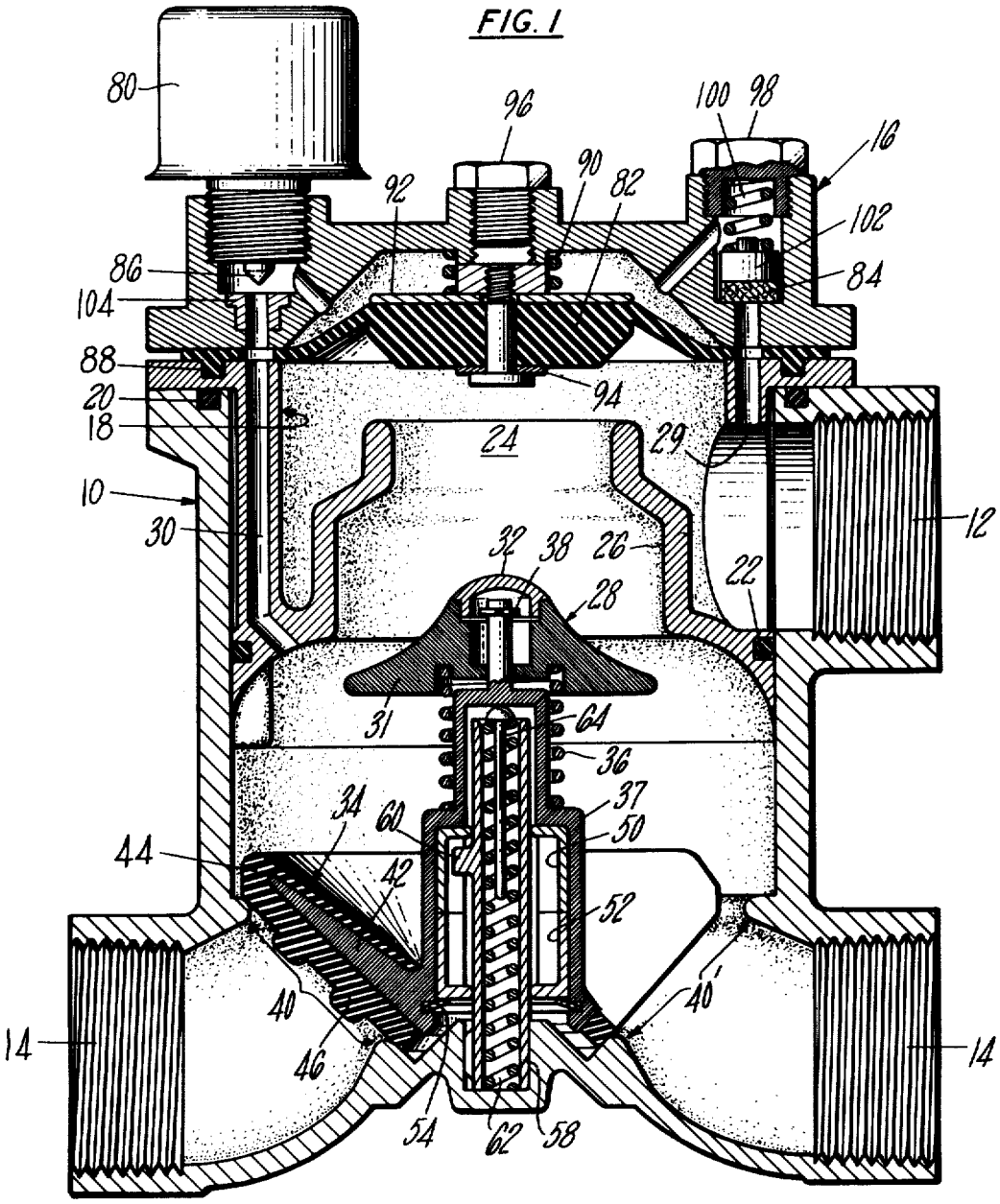
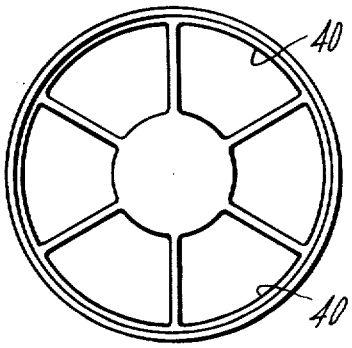
FIG. 2
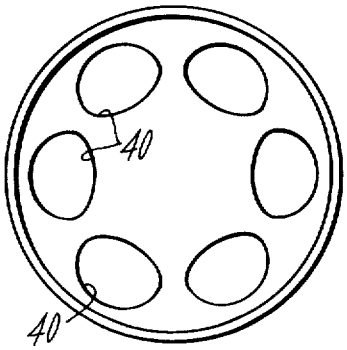
FIG. 2A
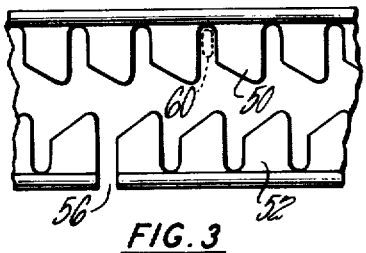
FIG. 3

SEQUENCING VALVE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to fluid handling and particularly to the delivery of fluid from a source to a plurality of fluid consuming loads in a predetermined sequence. More specifically, this invention is directed to distributing valves operable to sequentially deliver a fluid under pressure from a source to one or more discharge or distribution lines. Accordingly, the general objects of the present invention are to provide novel and improved methods and apparatus of such character.

2. Description of the Prior Art

While not limited thereto in their utility, fluid control devices of the general type to which the present invention relates have been found to be particularly useful in irrigation systems. In such systems it is often desired to supply water from a single source in sequence to a number of distribution lines; each of the distribution lines typically including a plurality of sprinkler heads. Such systems require at least one sequential distributing valve which is operable to connect the source to the distribution lines in a predetermined sequence; the distribution lines typically being supplied in individual fashion.

Sequencing valves for use in the above briefly described irrigation systems, as well as in numerous other environments, are well known in the art. However, as will be described briefly below, all previously available sequencing valves have been characterized by a number of inherent operational deficiencies. Certain of these deficiencies have characterized the sequencing valves designed in accordance with each of the several technical approaches to providing flow switching which have been followed.

As noted immediately above, prior art sequencing valves have embodied a number of different technical approaches. Thus, by way of example, a plurality of electrically or hydraulically operated remotely controlled valves have been proposed and in some cases utilized. As employed in this brief discussion of the prior art, a remotely hydraulically controlled valve is a device which is operated in response to a control signal delivered via a hydraulic line which is separate from the main fluid flow path or via an electrical cable. While possessed of a number of other significant disadvantages, the remotely operated valves of the prior art also share two principal deficiencies with all other prior art sequencing valves. These deficiencies are excessive system cost due to the necessity of employing a plurality of valves and a corresponding lack of system reliability resulting from the comparatively large total number of moving parts employed in a system.

Another approach to the design of a successful sequencing valve has been embodied in solenoid operated devices. Although directly operated solenoid controlled sequencing valves have been proposed, such valves have not been used extensively due to their high cost, limited utility and lack of reliability. Thus, by way of example, direct operated solenoid controlled sequencing valves are not suitable for use with a completely automatic pump fed distribution system unless a separate timer is employed to turn on the pump. Solenoid controlled directly operated sequencing valves are also characterized by high pressure loss and high electrical power requirements.

Another approach to the provision of a sequencing flow control resides in the flow meter operated type valve. Flow meter operated valves meter the same amount of flow to each distribution circuit regardless of the individual circuit requirements and are not adjustable for cycle time other than by increasing the number of complete cycles. Also, the valve sealing element is subject to wear due to a sliding contact. Flow meter operated valves also require a single station timer for fully automatic operation and such valves are characterized by a relatively high pressure loss. Additionally, flow meter operated valves are overly complex and subject to contamination damage.

The technical approach to sequencing valve design which has resulted in the prior art devices which have achieved the widest acceptance contemplates that the valve discharge port switching function be controlled by pulsing the flow from the fluid source. Such flow operated sequencing valves have employed ball-type valves, as exemplified by H. Davis U.S. Pat. No. 3,472,265, and rotary-axially movable valve elements, as exemplified by the cam operated device of E. Haggard U.S. Pat. No. 3,369,565. While the Haggard patent discloses a sequencing valve having an integrally mounted solenoid operated pilot valve, it will be obvious to those skilled in the art that the sequencing valve of U.S. Pat. No. 3,369,565 can operate in response to supply fluid pulses delivered to the valve inlet as a result of the operation of a suitable control device located at the source of the fluid to be distributed.

As noted above, all previous flow operated sequencing valves have been characterized by several inherent deficiencies. Perhaps the most significant of these deficiencies has been an inability of the prior art devices to operate over a wide flow range; this deficiency preventing the adaptation of a single valve to a variety of applications. The inability to operate over a wide flow range has typically been evidenced as a failure of the valve to cycle at low flow rates. There have been a number of attempts made to provide a sequencing valve which are cycle at low flow rates. The prior attempts to obtain low flow rate cycling are exemplified by the valve disclosed in U.S. Pat. No. 3,524,470 to C. Kah, Jr. The device of U.S. Pat. No. 3,524,470 incorporates flap valves in the valving member and, while this technique reduces the flow required to cycle, thus inherently offers substantial area for leakage around the valving member which establishes the minimum flow rate required to cycle. Additionally, the valve of U.S. Pat. No. 3,524,470 exhibits a narrow operational flow range if a unreasonable pressure loss is to be maintained.

Thus, to summarize the above, in previously available flow operated sequencing valves, significant flow has been required for valve operation since the pressure drop across the valve element is used to generate the force required for cycling. Obviously, if a reasonable pressure drop at high flow rates is to be maintained, a large port area in the valve element must be provided and the flow rate through this port area and around the outer diameter of the valve element must be significant to generate an adequate pressure differential to achieve cycling. Accordingly, prior art flow operated sequencing valves have been characterized by a compromise between a high pressure drop and an extremely large valve structure.

The second most significant deficiency of all prior art sequencing valves, including those briefly discussed above, is the water hammer effect created as the valves are cycled. The possible detrimental effects of water hammer to the valve itself and other components of the fluid distribution system are well known and will not be discussed herein. Water hammer has resulted because, prior to complete cycling, all of the outlet ports are exposed to the inlet thereby providing very low resistance to flow and consequently a high flow rate. When the valve element is seated the resistance to flow is reduced to that of a single flow circuit and the total flow is suddenly reduced thus producing water hammer.

A further disadvantage of prior art flow operated sequencing valves resides in the susceptability of the previous devices to jamming failure resulting from contamination. In many installations sand or other contaminates may enter the system and these contaminates may wedge between close fitting parts, such as the valving member and housing, thereby causing improper operation; this being a particular problem in the typical prior art device wherein such close fitting parts are exposed to the flow stream through the sequencing valve. The lack of reliability of prior art flow operated sequencing valves resulting from their susceptability to contamination has been aggravated by the fact that the devices have employed a comparatively large number of moving parts. Prior art flow operated sequencing valves have been further characterized by delay in or failure to cycle as a result of back flow from elevated outlet circuits. The typical prior art solution to the "back flow" problem has been to incorporate check valves in the elevated circuits and this, of course, has added to the expense and complexity of the entire distribution system.

SUMMARY OF THE INVENTION

The present invention overcomes the above discussed and other deficiencies and disadvantages of the prior art by providing a flow compensated sequencing valve wherein separate valve elements are employed to generate the force required for cycling and to accomplish discharge port sealing and switching. In accordance with a preferred embodiment, the force generating element is a pintle member which cooperates with an inlet port defining member to define a variably restricted flow path and thus to generate adequate forces for cycling even at low flow rates. The pintle member is resiliently coupled to and thus free to over-travel relative to the valve rotor, which functions as the discharge port sealing member, and low pressure losses at high flow rates are accordingly achieved. Since a pressure drop across the port sealing member is not required for cycling, valves in accordance with the present invention may incorporate large low pressure loss discharge ports and are characterized by a large clearance between the port sealing member and valve housing whereby a high degree of contamination insensitivity is achieved.

Also in accordance with the preferred embodiment of the invention, the elements which provide for the indexing of the valve sealing member are located in such a manner as to be isolated from exposure to any contaminates which may be carried by the fluid being distributed. Further, a conical rotor configuration directs any contaminates entering the valve to the open discharge port in the preferred embodiment thus providing a self-cleaning feature while permitting a smooth transition from the valve exit port to the discharge fitting.

In addition to contamination insensitivity and an independent variable restriction, as defined by the pintle member, sequencing valves in accordance with the present invention may include a solenoid operated pilot valve. When the pilot valve subassembly is included it will comprise a flexible diaphragm and the actual pilot valve will control the invention of a diaphragm chamber whereby the pressure across and thus the movements of the diaphragm are controllable. Movements of the diaphragm are coupled to the pintle either directly mechanically or fluidically in the interest of sufficiently decreasing the pressure differential across the pintle to permit cycling.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 1 is a cross-sectional, side elevation view of a first embodiment of a flow operated sequencing valve in accordance with the present invention, the embodiment of FIG. 1 including an integral solenoid operated pilot valve;

FIGS. 2 and 2A are schematic views depicting two of the several alternate outlet port configurations which may be employed in the valve of FIG. 1;

FIG. 3 is a linear representation of the cylindrical cam mechanism of the valve of FIG. 1.

DESCRIPTION OF THE PREFERRED EMBODIMENTS

Figure 4:
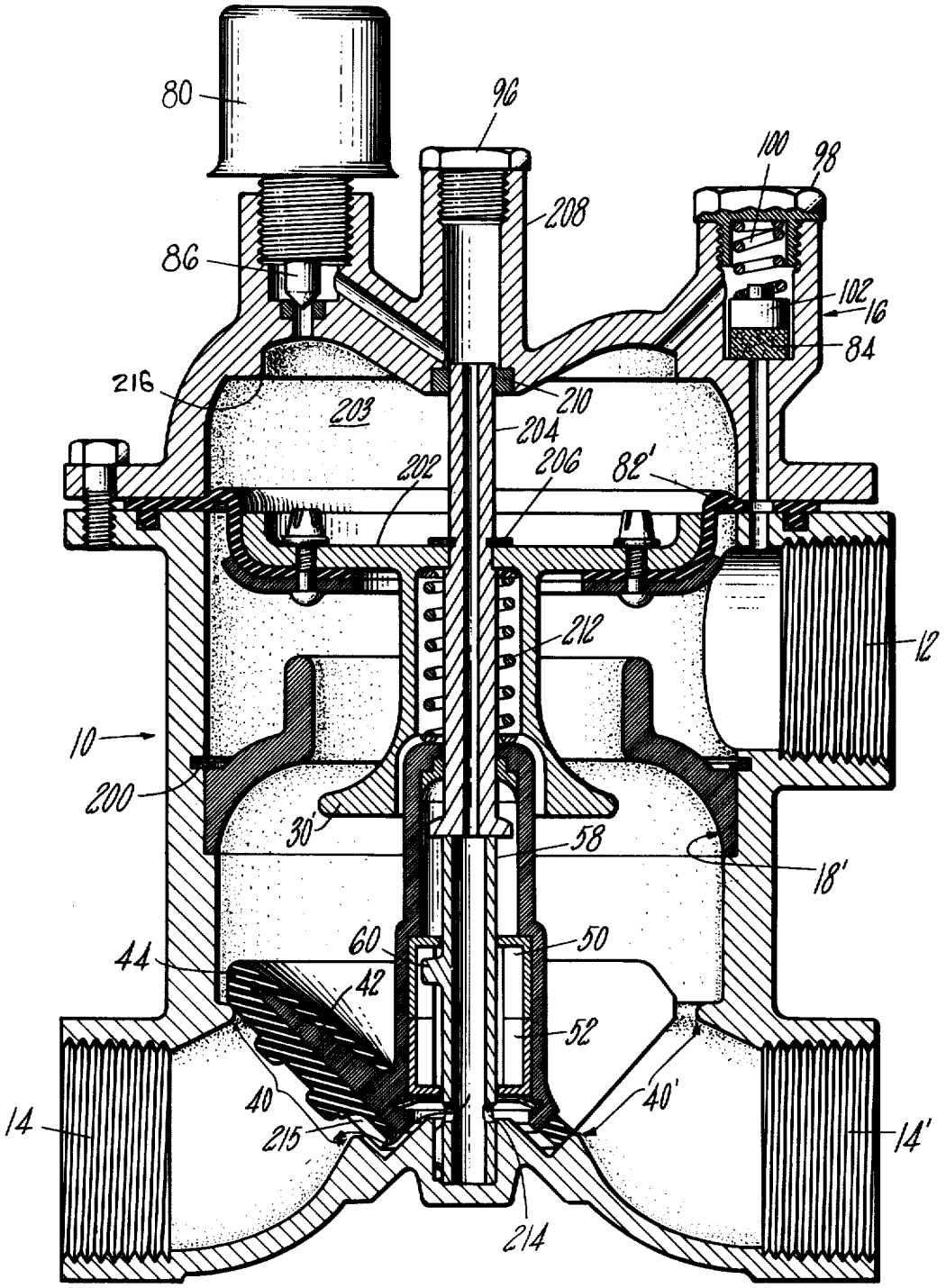
FIG. 4 is a cross-sectional, side elevation view of a second embodiment of a valve in accordance with the present invention.

With reference now to FIG. 1, a flow compensated sequencing valve in accordance with the present invention comprises a housing indicated generally at 10. Housing 10 is preferably comprised of a non-corrosive metal but may also be fabricated from a suitable plastic material. Housing 10 defines an inlet connection 12 and a plurality of outlet connections 14. As may be seen by reference to FIGS. 2 and 2A, in one embodiment the valve of FIG. 1 was provided with six horizontal outlet connections 14. The outlet connections 14 may also be configured for vertical discharge or at some intermediate angle suitable for a particular application.

Housing 10 is provided with a central bore which is open at the top of the housing with the valve oriented as shown in FIG. 1; the valve central bore in part providing communication between inlet connection 12 and a selected discharge connection or connections 14. In the embodiment of FIG. 1 the central bore of housing 10 is capped by a diaphragm housing indicated generally at 16. The purpose of the diaphragm housing and the components supported thereby will be described in detail below. It is believed that it will be sufficient for the present to note that diaphragm housing 16 may be replaced by a cap and that the diaphragm housing or cap is secured to valve body 10 by means of a plurality of bolts; the bolts having been omitted from the drawing in the interest of facilitating understanding of the invention.

An "inlet" housing member, indicated generally at 18, is positioned within the central bore of housing 10 as shown. Member 18 is provided with an outwardly extending flange which is sandwiched between housing member 10 and cap housing 16; an O-ring seal 20 being provided to prevent external leakage between members 18 and 20. A second seal ring 22 prevents leakage between the inlet connector 12 and the interior of the valve housing past member 18. Member 18 in part defines, for the purposes to be described below, a plurality of fluid flow paths. The principal flow path is directly between inlet connector 12 and the interior of housing 10 downstream of member 18 via an opening or inlet port 24. Opening or port 24 is commensurate in diameter with inlet connector 12 and is defined by an upwardly and inwardly extending portion 26 of member 18. Portion 26 of member 18 cooperates, in the manner to be described below, with a pintle assembly indicated generally at 28. Member 18 partly defines further fluid flow paths 29 and 30 which communicate with the interior of diaphragm housing 16 for the purposes to be described below.

The pintle assembly 28 includes a pintle 31 and a pintle cap 32 and may be comprised of a light-weight non-corrosive metal alloy or molded plastic. The pintle assembly 28 is mounted, in the manner to be described below, on the valve rotor assembly, indicated generally at 34, and is capable of limited reciprocal motion with respect to the rotor. The pintle assembly is biased away from the rotor assembly and toward the inlet port 24 by spring 36 and is prevented from becoming disengaged from an upwardly extending portion 37 of the rotor by a retaining ring 38.

The rotor assembly 34 includes, in addition to aforementioned spring 36 and extension 37, a valve member which selectively cooperates with all but a preselected number, typicaly one, of discharge ports formed in housing 10. In FIG. 1 a pair of discharge ports 40 and 40' are shown; port 40 being closed by the rotor valve member 42 and port 40' being open to permit flow through the valve and out of the outlet connector 14 associated with the open discharge port. A pair of alternate discharge port arrangements are shown in FIGS. 2 and 2A. The discharge ports are defined by housing 10 and are formed with rounded valve seat defining portions which are slightly raised with respect to the direction of motion of the cooperating valve member 42. The valve member 42 is covered by a suitable resilient material 44 whereby leakage about the valve member through the closed ports is prevented. Member 44 may be comprised of a suitable elastomer material and is provided with a plurality of integral ribs 46 for the purposes to be described below. In one embodiment the valve member portion 42 of the rotor assembly 34 has a frustoconical shape; this shape enhancing the reliability of the valve as will be described below. It will be obvious to those skilled in the art that a flat rotor could be employed in the present invention at the expense of requiring a larger valve housing. Similarly, a hemispherical rotor configuration is possible.

As discussed above, the pintle assembly 28 is mounted on an extension 37 of the rotor. In the disclosed embodiment extension 37 is integral with valve member 42 and includes a solid upper portion and two coaxial hollow portions of different diameter. The junction between the hollow portions of extension 37 defines a shoulder for grounding a first end of the spring 36; the spring being coaxial with the intermediate diameter portion of extension 37. An upper cam 50 is mounted in and affixed to the lower or larger diameter portion of valve member extension 37; upper cam 50 thus rotating with the rotor assembly 34 when the valve is sequenced in the manner to be described below. A lower cam 52 is also mounted within and rotates with extension 37; the cams 50 and 52 being maintained in position by means of a splined arrangement in combination with extension 37 and a cam retaining ring 54. The configuration of cams 50 and 52 may be seen from FIG. 3 which represents the cams as they would appear if flattened out linearly. It will be noted that cam 52 is provided with an entrance slot 56 whereby a cam follower may be inserted into the cam assembly. The cam members function as both cam and bearing and thus are preferably made of a long wearing material with a low coefficient of friction. Thus, by way of example only, when a plastic rotor is employed the cams may be fabricated from cast or molded nylon sized to compensate for the effects of water absorption. When a metal rotor is employed the cams may, also by way of example only, be formed of impregnated bronze.

The combined pintle-rotor assemblies are mounted coaxially of a center post 58. Post 58 is in turn coaxial with the valve housing 10 and is keyed therein as shown. Center post 58 is of tubular construction and has integral therewith an outwardly extending cam follower 60. The center post may either be cast or a section of tubing with follower 60 and the locating key brazed thereto can be employed. The stationary cam follower 60 cooperates with the cams [52] *50* and [54] *52* in the manner to be described below to index a valve. A return spring 62 is positioned within center post 58 and a guide pin 64 is supported by spring 62. Guide pin 64 has a hemispherical head, to reduce rotational friction, which contacts the top interior surface of the intermediate diameter portion of extension 37 thereby urging the rotor-pintle assemblies upwardly toward the inlet port 24.

Before continuing with a description of the FIG. 1 embodiment, the operation of those portions of the sequencing valve already described will be discussed. The valve is shown in FIG. 1 in the seated or flowing position. That is, as shown in FIG. 1 the valve has been indexed to open discharge port 40' and the rotor assembly is at the bottom of its stroke. FIG. 1 thus depicts the full flow condition. If flow through the inlet port 24 is momentarily interrupted the combined action of springs 62 and 36 will cause the pintle and rotor assemblies to move upwardly. During the upward movement the cam follower 60 will contact the lower cam 52. As will be obvious from FIG. 3, the rotor will be partly indexed in the clockwise direction toward its next position during the upward stroke. When the valve assumes its no flow condition the pintle 31 will effectively block the inlet port 24. When pressure is again applied at inlet port 24 the pintle assembly will be forced downwardly and the force generated by the application of fluid pressure to the pintle will be transmitted from the pintle to the rotor via spring 36 thereby causing the rotor to move downwardly. The downward motion of the rotor will, due to the combined action of the cam follower 60 and associated cams 50 and 52, complete the rotation of the valve member 42 to its new position. It is to be particularly noted that the contour of the lower indexing cam 52 insures, during the last portion of the downward stroke, axial motion only of the rotor thereby preventing scuffing of the sealing surface on the valve seats defined by the discharge ports 40.

To summarize the preceding operational description, as flow enters the inlet port 24 the spring loaded pintle assembly 28 provides a predetermined restriction. The clearance between pintle 28 and the inlet port 24 can be relatively large in the interest of insuring contamination insensitivity while still presenting a small leakage area that will establish the minimum flow rate necessary to create the pressure differential required to cycle the valve. The resulting pressure differential developed across the pintle 31 provides a force which is a combined function of the pintle and rotor spring rates. This force is transmitted to the rotor assembly 34 by the lower end of the pintle spring 36 and is of sufficient magnitude to force the rotor to the bottom of its travel against the force of the rotor return spring 62. A particularly significant feature of the invention is the fact that the pintle is free to over-travel relative to the rotor as a function of flow with the rotor seated at the bottom of its travel as shown in FIG. 1. A low pressure loss is thus maintained across the pintle assembly over a wide flow range. Also, separation of the cycling and sealing elements permits the valve to cycle consistently at low flow rates while having an acceptable pressure loss at high flow rates.

At the bottom of the stroke of the rotor all the valve outlets except those selected by the rotor configuration are sealed by contact of the flexible member 44 with the rounded edges which define the valve seats about the discharge ports 40. The interior of the extension 37 of the rotor, which includes the cams and cam follower, is also sealed from the flow stream by the flexible lower surface on the rotor and the indexing elements are accordingly isolated from exposure to any contaminates which may be carried by the fluid being distributed. Additionally, the conical rotor configuration directs any contaminates entering the valve to the open discharge port thus providing a self-cleaning feature. The self-cleaning feature in combination with isolation of the indexing elements from the main stream results in virtual elimination of jamming as a result of exposure to fluid-born contaminates. The conical rotor also allows a smooth transition from the valve exit port 40 to the discharge fitting 14.

The raised ribs 46 on the flexible member 44 insure that the valve will be unseated when flow is interrupted even though there may be a residual static pressure in the valve housing due to the presence of an outlet circuit with an average elevation higher than that of the valve. The ribs 46 will raise the rotor a predetermined height off the discharge housing thereby allowing drainage of the elevated circuit through the remaining outlets. This drainage will lower the static pressure level and allow the rotor return spring 62 to move the rotor upwardly. As previously explained, as the rotor is pushed to the top of its stroke it is rotated by the lower cam 52 acting against the stationary cam follower 60 to provide partial indexing to the next port position.

It is particularly noteworthy that the use of an independent variable restriction, as defined by the pintle assembly 28, allows the use of large, low pressure loss outlet ports. Referring again to FIGS. 2 and 2A, segmented annular discharge ports are used to minimize the valve size and leave little unused space for contamination build-up. A number of different outlet port configurations can, of course, be utilized and the two different configurations depicted in FIGS. 2 and 2A are representative only. The cams 50 and 52 may, of course, be changed to change the number of active outlets. Changing of cams, and any other maintenance procedure that may be necessary, is easily accomplished by removing the cap or solenoid housing 16 thereby permitting access to the interior of the housing 10. With the cap removed, the inlet housing 18 may be lifted out, the pintle-rotor assembly indexed so as to align cam follower 60 with the entrance slot 56 in lower cam 52 and the entire interior assembly with the exception of the center post 58 lifted out of the housing.

Returning to a discussion of FIG. 1, should it be desired to use the sequencing valve of the present invention with a city-fed water system; i.e., with a system which does not provide for convenient shut-off of the supply of fluid to the valve in order to command cycling; a solenoid operated shut-off valve may be incorporated in the sequencing valve assembly. To this end, the valve housing cap may be replaced by a solenoid valve housing as shown. Solenoid housing 16 will include a solenoid 80, a normally closed solenoid operated valve member 86 and a spring loaded diaphragm 82. Flow is allowed to enter the diaphragm cavity; i.e., the space between the upper side of diaphragm 82 and the inside top of housing 16, via aforementioned passage 29, a filter 84 and an orifice assembly 102; the orifice assembly incorporating fluidic resistors in the interest of contamination insensitivity. The filter keeps contamination out of the housing 16 thereby insuring proper seating of the solenoid operated valve element or solenoid pin 86.

As may be seen from FIG. 1, the diaphragm 82 is sandwiched between inlet housing 18 and diaphragm housing 16 and has an integral O-ring seal 88 to insure against leakage. Diaphragm 82 may be comprised of a suitable elastomer material and includes a central portion of increased thickness which functions as a valve element; the diaphragm 82 cooperating with the portion 26 of inlet housing 18 which defines inlet port 24. Diaphragm 82 is loaded toward inlet port 24 by spring 90 and is supported by washers 92 and 94. A bleed plug 96 is provided to permit removal of any air which may become trapped above diaphragm 82. Access to filter 84 for cleaning is achieved by a filter access plug 98; plug 98 including a recess which houses a spring 100. The end of spring 100 displaced from plug 98 contacts orifice assembly 102 which, in turn, is positioned directly downstream of filter 84 and holds the filter in place. The filter, of course, also prevents contamination of the orifice in assembly 102.

In operation, flow is allowed to enter the diaphragm cavity through filter 84 and the orifice assembly 102. The orifice assembly provides means for dampening the response of the diaphragm in the interest of preventing water hammer and limits the flow rate into the diaphragm cavity. Flow is allowed to leave the diaphragm cavity through the solenoid cavity in which the solenoid valve element 86 is disposed. The solenoid cavity is ported to the main chamber of the sequencing valve downstream of pintle assembly 28 via passage 30. The flow path for fluid exiting the diaphragm cavity offers less resistance than is presented to flow entering the cavity through orifice assembly 102.

When the solenoid 80 is energized the solenoid pin or valve element 86 retracts to the position shown in FIG. 1 thereby allowing fluid to flow out of the diaphragm cavity thus lowering the diaphragm cavity pressure. This action will cause a pressure differential to be developed across the diaphragm and the diaphragm will move upwardly against spring 90. When solenoid 80 is deenergized the pin or valve element 86 extends and seals the solenoid chamber by contacting the valve seat defined by insert 104 thus closing flow path 30. The closing of the solenoid valve will permit the pressure differential across the diaphragm 82 to decay and the diaphragm will move downwardly under the influence of spring 90. At the lower limit of its spring induced movement the valve element defining portion of the diaphragm will contact the upper end of inlet housing portion 26 thereby interrupting flow from inlet connector 12 past the pintle assembly 28 via inlet port 24. The valve will thus cycle in the manner described above.

Referring now to FIG. 4, a second embodiment of a solenoid actuated, flow operated sequencing valve in accordance with the present invention is disclosed. The valve of FIG. 4 differs from the FIG. 1 embodiment by means of the employment of a piston-diaphragm assembly to unseat the valve element rather than interrupting flow and allowing a spring to unseat the valve element. The embodiment of FIG. 4, accordingly, has application in city water-fed systems and/or in situations wherein there are elevated outlet circuits which might delay cycling due to back pressure effects.

In the FIG. 4 embodiment a shoulder is formed on the interior surface of housing 10 and an inlet port defining member 18' is mounted on this shoulder by means of a snap ring 200. Also in the FIG. 4 embodiment, the pintle is in the form of a combined piston-diaphragm assembly including a pintle portion 30' and a piston element 202. The piston element 202 is attached to a diaphragm 82' as shown. Diaphragm 82' is sandwiched between the solenoid housing 16 and the main valve housing 10 so as to define a piston chamber 203. The piston-diaphragm assembly is mounted on and moves with a piston rod 204 which has a longitudinal passage therethrough; a snap ring 206 being employed to maintain the positioning of the piston-diaphragm assembly with respect to the piston rod. Motion of the piston rod with respect to a cylinder extension 208 of diaphragm housing 16 is guided by a piston bushing 210. The pintle portion of the piston is hollow as shown and provides a housing for the rotor spring 212.

To briefly describe operation of the FIG. 4 embodiment, the first motion of the piston during cycling lifts the lower or pintle portion of the piston-diaphragm assembly toward the inlet housing bore defined by member 18'. The sequencing valve will be unseated just prior to the pintle reaching the minimum flow position. The controlling flow area for the remainder of the valve stroke is thus set by the pintle/inlet housing clearance. This arrangement prevents a sudden flow increase when the valve element or rotor is unseated and a sudden flow decrease when the valve is seated and thereby prevents water hammer when the valve is cycled by maintaining essentially constant flow during the cycling procedure.

Flow enters the piston chamber 203 through filter 84 and orifice assembly 102; orifice assembly incorporating fluidic resistors in the interest of contamination insensitivity. The venting of flow from the piston chamber is controlled by means of the solenoid operated valve element 86. When the solenoid is deenergized, and the solenoid valve pin 86 extended, the piston chamber will be dead ended and the pressure inside the chamber will be the same as the supply pressure. Under these conditions the pressure differential across the pintle portion of the piston will cycle the piston downwardly against the top of center post 58, which functions as a stop, to the position shown. The valve element will be seated prior to completion of the piston stroke through the action of the spring loaded connection between the piston and valve elements as provided by spring 212, and pintle overtravel is thus permitted in the interest of flow rate compensation.

When solenoid 80 is energized and the pin or valve element 86 retracted, fluid is vented from the piston chamber via the solenoid valve chamber, the passage in piston rod 204 and the tubular center post 58. The center post 58 is provided with discharge ports 214 whereby the flow vented from the piston chamber may be directed to distribution circuits which are not currently flowing through flow passages 215 integral with rotor assembly 44. Since flow into the piston chamber is restricted by orifice assembly 102, the pressure in the chamber will be reduced when the solenoid valve is opened and the piston will accordingly travel to its upper limit of travel as defined by stops 216. The upward motion of the piston will, of course, partly cycle the valve and the cycle will be completed in the manner described above when solenoid 80 is deenergized thereby allowing the valve element 86 to interrupt the communication between the piston chamber and the discharge path via the piston rod and center post.

As will now be obvious to those skilled in the art, the above described valve solves the problems associated with previous sequencing valve concepts and offers cost and reliability advantages when compared to the prior art. The present invention will provide a progressive sequencing of the individual circuits in a flow system when the inlet flow is cycled or in response to an electrical signal applied to a pilot solenoid valve. Thus, completely automatic operation is possible employing the present invention with a single station timer operating the pilot solenoid or a pump relay.

It is particularly significant that valves designed in accordance with the present invention will operate reliably, with a low pressure loss, over a wide flow range. This capability allows one valve to fit a variety of applications or have application in an installation which may have a wide range of flow rates in the individual circuits. Additionally, the unique design of the present invention permits the valve to cycle without detrimental water hammer effects; this desirable result being due to the action of the valve pintle which restricts flow during cycling.

A principal design feature of the present invention is the utilization of separate valve elements to generate the force required for cycling and to provide the port sealing function. A supplementary, but also important, design feature resides in the ability of the force generating element to over-travel relative to the port sealing element as achieved through the use of resilient means for interconnecting the two elements. The force generating element can therefore provide adequate forces for cycling at low flow rates and yet over-travel after the rotor is seated to maintain a low pressure loss at high flow rates. Since a pressure drop across the port sealing element is not required for cycling, the valve can incorporate large low pressure loss discharge ports and a large clearance between the port sealing and the valve housing in the interest of contamination insensitivity.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A sequence valve comprising:

housing means, said housing means defining an inlet connection and a plurality of outlet ports displaced from said inlet connection, said housing means further defining an internal bore whereby fluid communication may be established between said inlet connection and outlet ports;

valve means disposed in said housing means bore, said valve means being reciprocal and rotatable and cooperating with said outlet ports to perform a valving function, said valve means having at least a first opening therein whereby communication between at least one of said outlet ports and said valve means bore will be established at all times;

pressure responsive force generating means disposed in said housing means bore upstream of said valve means, said force generating means being coupled to said valve means for causing reciprocation thereof in response to fluid pressure variations in said housing means bore, said pressure responsive force generating means being movable relative to said valve means in response to flow through the valve to form a variable restriction; and cam means disposed in said housing means for causing stepwise rotation of said valve means in response to reciprocation thereof produced by pressure induced movements of said force generating means.

2. The sequencing valve of claim 1 wherein said pressure responsive force generating means is resiliently coupled to said valve means.

3. The sequencing valve of claim 1 further comprising:

means defining an inlet port, said inlet port defining means being positioned in said valve housing means bore and cooperating with said force generating means to define a flow path between said inlet connector and outlet ports, movements of said force generating means causing variation of the area of said flow path commensurate with applied pressure.

4. The sequencing valve of claim 2 further comprising:

means defining an inlet port, said inlet port defining means being positioned in said valve housing means bore and cooperating with said variable restriction defining means, movements of said variable restriction defining means causing variation of the area of the flow path between said housing means inlet connection and outlet ports.

5. The apparatus of claim 1 wherein said pressure responsive force generating means comprises:

pintle means; and spring means resiliently coupling said pintle means to said valve means.

6. The apparatus of claim 4 wherein said variable restriction defining means comprises:

pintle means; and spring means resiliently coupling said pintle means to said valve means.

7. The sequencing valve of claim 6 wherein said valve means comprises:

a valve member which cooperates with said housing means outlet ports to selectively close at least one of said outlet ports; and spring means biasing said valve member away from said outlet ports.

8. The sequencing valve of claim 7 wherein said valve member presents a frustoconical surface to fluid flowing through the sequencing valve, said frustoconical surface being interrupted at each opening in said valve member.

9. The sequencing valve of claim 6 wherein said valve means comprises:

a valve member which cooperates with said housing means outlet ports to selectively close at least one of said outlet ports.

10. The sequencing valve of claim 9 wherein said cam means comprises:

cooperating upper and lower cams affixed to and movable with said valve member; and a fixed position cam follower mounted from the interior of said housing means.

11. The sequencing valve of claim 10 wherein said valve member has a hollow center portion extending coaxially of the housing means bore and wherein said cooperating upper and lower cams are mounted within said hollow valve member center portion whereby said cam means are isolated from fluid passing through the valve.

12. The sequencing valve of claim 11 wherein said cam follower comprises:

a tubular member affixed to said housing means and being coaxial with said valve member hollow center portion, said tubular member being disposed within said valve member center portion; and a cam follower projection extending outwardly from said tubular member.

13. The sequencing valve of claim 12 wherein said valve means further comprises:

spring means biasing said valve member away from said outlet ports, said biasing spring means being disposed within said tubular member.

14. The sequencing valve of claim 4 further comprising:

control valve means, said control valve means being remotely operable to generate pressure pulses which control movement of said pressure responsive force generating means in the downstream direction.

15. The sequencing valve of claim 14 wherein said control valve means comprises:

diaphragm means disposed in said housing means bore, said diaphragm means defining a diaphragm chamber upstream of said inlet port defining means;

means providing communication between the interior of said diaphragm chamber and said housing means inlet connection;

means for selectively controlling the venting of said diaphragm chamber to generate a pressure differential across said diaphragm means whereby said diaphragm means will move in a first direction; and means coupling movements of said diaphragm means to said pressure responsive force generating means.

16. The sequencing valve of claim 15 wherein said coupling means comprises:

a plug member supported by said diaphragm means and cooperating with said inlet port defining means for interrupting the flow of fluid through said inlet port whereby the pressure differential across said force generating means is removed.

17. The sequencing valve of claim 4 further comprising:

diaphragm means disposed in said housing means, said diaphragm means defining a diaphragm chamber upstream of said inlet port defining means;

means providing communication between the interior of said diaphragm chamber and said housing means inlet connection;

means for selectively controlling the venting of said diaphragm chamber to generate a pressure differential across said diaphragm means whereby said diaphragm means will move in the upstream direction; and means mechanically connecting said diaphragm means to said pressure responsive force generating means, down stream movements of said pressure responsive force generating means being responsive to flow through the valve when said diaphragm chamber is unvented.

*18. A sequencing valve comprising:*

*housing means, said housing means defining an inlet and a plurality of outlet ports displaced from said inlet, said housing means further defining an internal flow passage whereby fluid communication may be established between said inlet and said outlet ports;*

*valve means disposed in said housing means, said valve means being reciprocal in response to fluid flow through the valve and rotatable and cooperating with said outlet ports to perform a valving function, said valve means having at least a first opening therein whereby communication between at least one of said outlet ports and said flow passage will be established at all times;*

*pressure responsive means disposed in said housing means, said pressure responsive means being operatively coupled to said valve means for movement therewith and also being movable relative to said valve means in response to flow through the valve to form a variable restriction in said flow passage upstream of said valve means; and*

*cam means disposed in said housing means for causing stepwise rotation of said valve means in response to reciprocation thereof.*

*19. The sequencing valve of claim 18 further comprising:*

*means resiliently biasing said valve means and pressure responsive means to a first position commensurate with minimum flow.*

*20. The sequencing valve of claim 19 wherein said resilient biasing means includes:*

*a spring, said spring being compressible to permit movement of said pressure responsive means relative to said valve means in the direction of reciprocation of said valve means.*

* * * * *